United States Patent [19]

Kudo

[11] Patent Number: 4,706,022
[45] Date of Patent: Nov. 10, 1987

[54] ROTATING-PROBE DEFECT DETECTING DEVICE

[75] Inventor: Yasuichi Kudo, Kobe, Japan

[73] Assignee: Sanyo Special Steel, Hyogo, Japan

[21] Appl. No.: 712,152

[22] Filed: Mar. 15, 1985

[30] Foreign Application Priority Data

Mar. 29, 1984 [JP] Japan .................................. 59-62437

[51] Int. Cl.$^4$ ........................................... G01N 27/72
[52] U.S. Cl. ..................................... 324/243; 324/237; 324/262
[58] Field of Search ............... 324/228, 234, 235, 236, 324/237, 238, 262, 227, 242, 243

[56] References Cited

U.S. PATENT DOCUMENTS

| 3,736,501 | 5/1973 | Donkin | 324/262 X |
| 4,218,651 | 8/1980 | Ivy | 324/227 |
| 4,243,939 | 1/1981 | Grossman et al. | 324/242 X |
| 4,355,281 | 10/1982 | Toth et al. | 324/237 X |
| 4,596,953 | 6/1986 | Nagasaka et al. | 324/227 X |

Primary Examiner—Reinhard J. Eisenzopf
Assistant Examiner—Robert W. Mueller
Attorney, Agent, or Firm—Morris Fidelman; Franklin D. Wolffe

[57] ABSTRACT

A rotating-probe type defect detecting device, used for continuous inspection of an elongated test object moving in the longitudinal direction, such as round metal bar drawn out from a set of dies, comprising a plurality of test probes supported by a rotating frame structure around the object in a plane orthogonal to the central axis of the object for revolving about the object at high rotational stability, is provided. The device includes an inventive circuit for processing the output signals of the probes to enhance defect indicative portions of the signals and suppress the noise level, thereby exhibiting an improved detection characteristic of high signal-to-noise (S/N) ratio.

2 Claims, 4 Drawing Figures

ROTATING-PROBE DEFECT DETECTING DEVICE

This invention relates to a device for detecting defects in an elongated cylindrical object, such as round metal bar, which is moving longitudinally, and especially to such device of a type having a plurality of test probes revolving about the object to scan its surface in multi-helical fashion for detecting specific defects therein. The probes used in such device are adapted to scan the object with a suitable medium, such as magnetic flux, eddy current or light beam, as described, for example, in the article of J. P. Hoffman, "A New Rotating-Probe Eddy Current Method for Inspecting Bar Surface", in Material Evaluation, October (1975), pp. 237–242.

Defects in a drawn metallic bar surface are generally elongated longitudinally. Accordingly, when the probes are arranged in a line parallel to the longitudinal or moving direction of the bar, as in the device described in the opened Japanese patent specification No. 56-61644, they will detect the same defect almost at the same time and, therefore, it is possible to synthesize their output signals to reduce the effect of noise for effecting reliable detection. However, such linear arrangement of the probes results in an increased length of the rotating structure for supporting the probes, which may lead not only to inconvenience in service and maintenance, but also to reduced rotational stability and resultant vibration of the structure which can cause noises and other troubles.

The opened Japanese utility model specification No. 57-29850 suggests another arrangement of test probes, in which the probes are disposed at equal intervals around the object and in a plane orthogonal to the axis of the object. Such arrangement can result in an reduced length and improved rotational stability of the structure. However, the respective probes will detect the same defect at respective time points and, therefore, it may be difficult to distinguish the defect from noises though the presence of defect can be known by counting the output signals from the respective probes.

Accordingly, an object of this invention is to provide an improved detecting device of such type that a plurality of test probes are arranged at equal intervals around the object and in a plane orthogonal to the axis of the object for reducing the length of the rotating structure and improving its rotational stability, which can effectively distinguish a defect representative signal from any noise signal to improve reliability of detection.

In accordance with this invention, a device includes a plurality (n-number) of test probes are attached to a rotating structure and arranged at equal intervals (namely, $2\pi/n$) around a test object and in a plane orthogonal to the axis of the object. The output signals of respective probes are delayed respectively by t, 2t, 3t and so on by delay circuits, where t is time needed by the structure for rotation by an angle of $2\pi/n$. When the first probe detects a specific defect, the second, third and fourth probes have spent already such time periods as t, 2t and 3t, respectively, after they detected the same defect. Accordingly, if the output signal of first probe, the output signal of second probe delayed by time t, the output signal of third probe delayed by time 2t and the output signal of fourth probe delayed by time 3t are summed, the defect indicative or delayed signals overlap and enhance each other, while the noises are not always enhanced. This results in increase in the signal-to-noise (S/N) ratio in the defect detection. Similarly, the S/N ratio can be improved further by summing the output signals of second, third and fourth probes with delayed output signals of the other probes. As a much more reliable defect indicative signal is obtainable by synthesizing the resultant sum signals, it is utilized for producing an alarm and putting a mark on the object.

Now, the invention will be described in more detail below with reference to accompanying drawings in conjunction with an embodiment thereof.

Figure 1:
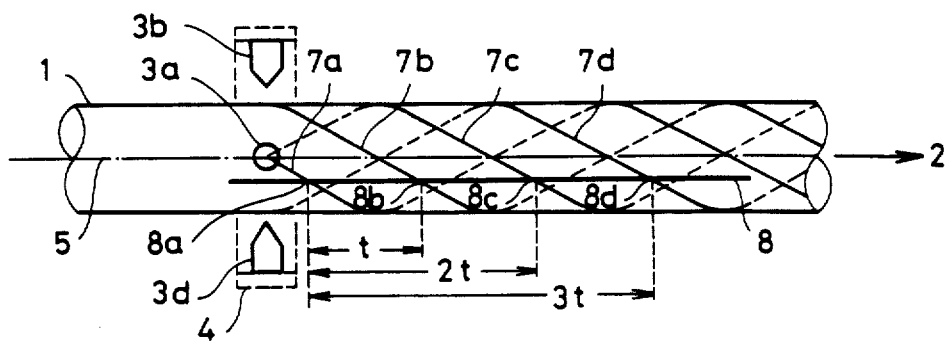
FIG. 1 is a side view representing a relationship between test probes and a test object in an embodiment of this invention.
Figure 2:
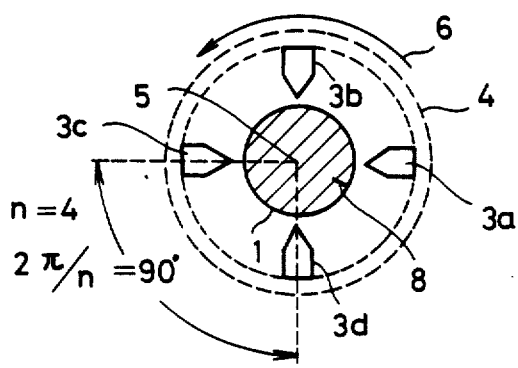
FIG. 2 is an end view of the structure of FIG. 1.

Referring to FIGS. 1 and 2, a cylindrical test object 1 is moved in an arrow direction 2 and test probes 3a, 3b, 3c and 3d are arranged at equal intervals around the object 1. The angular interval of the probes in this case is 90 degrees since the number of probes, n, is four. These probes are supported by a rotating structure 4 and caused to revolve about an central axis 5 of object 1 at a constant speed to an arrow direction 6. This results in scans of the object 1 with the probes 3a, 3b, 3c and 3d, respectively, along helical paths 7a, 7b, 7c and 7d.

Figure 4:
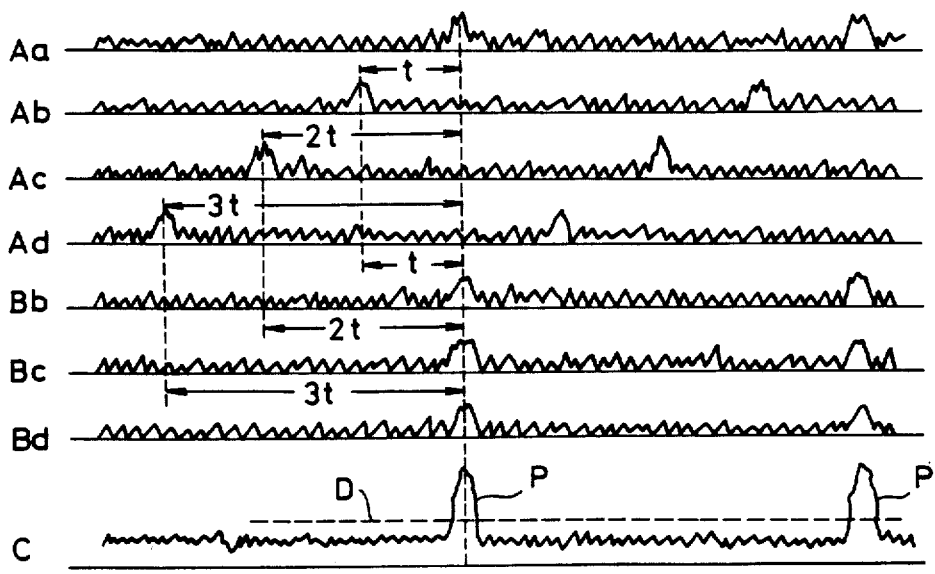
FIG. 4 is a diagram representing signal waveforms appearing at various circuit points of FIG. 3.

A defect 8 is detected by the probes 3a, 3b, 3c and 3d respectively at its intersections 8a, 8b, 8c and 8d with the helical paths 7a, 7b, 7c and 7d. In FIG. 4, waveforms Aa, Ab, Ac and Ad show the output signals of the test probes 3a, 3b, 3c and 3d, respectively, and peaks in these waveforms are indicative of their intersections with the defect 8. As described already, there is a time interval t between the adjoining waveforms and the defect indicative peak of the waveform Aa is later than those of the waveforms Ab, Ac and Ad by times t, 2t and 3t, respectively, as shown.

Figure 3:
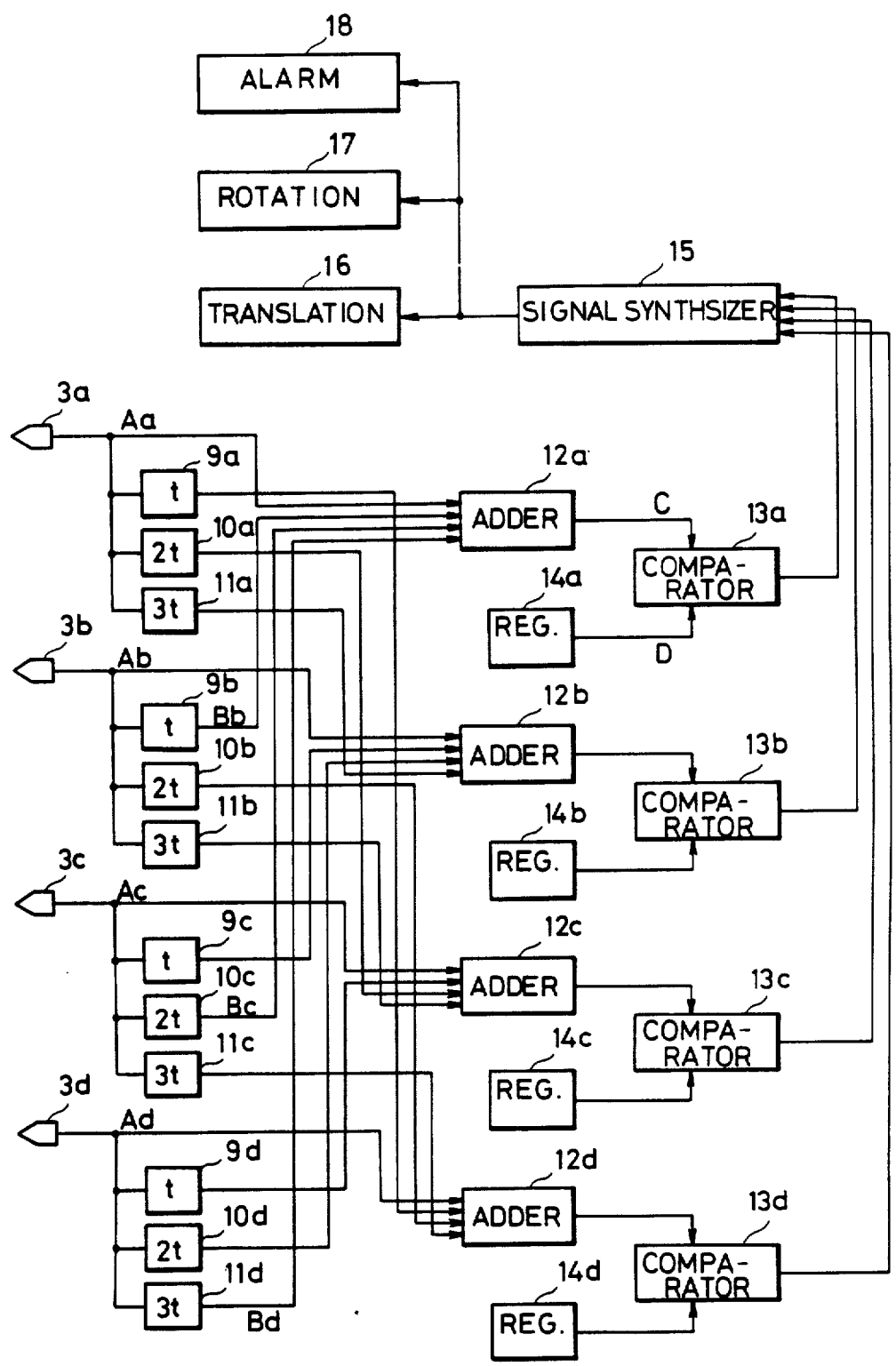
FIG. 3 is a block diagram of an electric circuit associated with the embodiment of FIGS. 1 and 2.

As shown in FIG. 3, the outputs of the probes 3a, 3b, 3c and 3d are coupled directly to adders 12a, 12b, 12c and 12d, respectively; through t-delay circuits 9a, 9b, 9c and 9d to adders 12d, 12a, 12b and 12c, respectively; through 2t-delay circuits 10a, 10b, 10c and 10d to adders 12c, 12d, 12a and 12b, respectively; and through 3t-delay circuits 11a, 11b, 11c and 11d to adders 12b, 12c, 12d and 12a, respectively. The outputs of the adders 12a, 12b, 12c and 12d are coupled respectively to one input of each of the comparators 13a, 13b, 13c and 13d, with a second input to each comparator coupled to an output of registers 14a, 14b, 14c and 14d, respectively. The outputs of comparators 13a, 13b, 13c and 13d are coupled to a signal synthesizer 15 whose output is coupled to utilization means, such as translation and rotation controls 16 and 17 and alarm device 18.

In operation, output signals Aa, Ab, Ac and Ad are delayed, respectively, by time t in delay circuits 9a, 9b, 9c and 9d, by time 2t in delay circuits 10a, 10b, 10c and 10d, and by time 3t in delay circuits 11a, 11b, 11c and 11d. Accordingly, output signals Bb, Bc and Bd of delay circuits 9b, 10c and 11d become as shown in FIG. 4. These output signals Bb, Bc and Bd are summed with the output signal Aa of probe 3a in adder 12a to produce a sum signal C as shown in FIG. 4. The defect indicative peaks of signals Aa, Bb, Bc and Bd, which substantially coincide in time, are summed to appear in signal C as eminent peaks P above the non-enhanced noise level. A d.c. potential level D which is lower than the peaks P but sufficiently higher than the noise level is registered previously in register 14a, and the comparator 13a is adapted to provide an output signal when the first input C is higher than the second input D. Thus, the comparator 13a provides a defect indicative signal at a highly improved S/N ratio. Similar description can be applied also to comparators 13b, 13c and 13d and the comparators 13a, 13b, 13c and 13d provide distinct defect indicative signals sequentially at mutual time intervals t. These signals are logically summed or otherwise processed appropriately in the signal synthesizer 15 and appear at its output as an amplified defect signal. In response to this signal, the translation and rotation controls 16 and 17 stop axial movement of the object 1 and rotation of the structure 4 and the alarm device 18 produces visible and/or audible alarm.

As described above, the device of this invention can provide a reliable defect indicative signal at high S/N ratio, which enables product inspection at high reliability. Moreover, the rotating structure 4 of this device exhibits high rotational stability since it includes the test probes arranged symmetrically about the axis of rotation. This feature is advantageous for improving inspection efficiency by increasing the speed of rotation of the structure 4. In addition, this radial arrangement of test probes enables reduction of the axial length of the structure 4, thereby facilitating service and maintenance.

For leading the output signals of the test probes out of the rotating structure 4 through slip-rings, it is advantageous to adopt time division system to reduce the number of slip-rings.

In the above description, no suggestion has been made about the detection medium emitted from each test probe since it has no direct connection to this invention. However, it is a matter of course that this medium can be arbitrarily selected in conformity with various test conditions from a variety of known magnetic, electric, sonic, optical and mechanical mediums, as suggested in Hoffman's article cited in the preface.

What is claimed is:

1. A rotating-probe defect detecting device for inspecting an elongated test object moving longitudinally comprising a plurality of test probes arranged around and facing said object at equal intervals and in a plane orthogonal to a central axis of said object, a structure for supporting said probes to rotate about said central axis; delay means for delaying output signals of said probes to obtain time coincidence signals, corresponding to a same angular position about said central axis; adder circuit means for summing said time coincidence signals and providing summing signals; judge circuit means for detecting presence of defects in said object from said summing signals and providing defect indicative signals; and means for synthesizing output signals of said judge circuit means in order to provide an amplified defect signal.

2. The device according to claim 1, wherein said judge circuit means comprises means for comparing a signal level of at least one element of a set of said summing signals, corresponding to one rotation of said probes about said axis, to a reference level and providing a defect signal to said synthesizing means only when said reference level is exceeded.

* * * * *

UNITED STATES PATENT AND TRADEMARK OFFICE
CERTIFICATE OF CORRECTION

PATENT NO. : 4,706,022
DATED : November 10, 1987
INVENTOR(S) : Yasuichi Kudo

It is certified that error appears in the above-identified patent and that said Letters Patent is hereby corrected as shown below:

On the title page assignee should read

--(73) Assignee: Sanyo Special Steel Company, Limited --

Signed and Sealed this

Fifth Day of July, 1988

Attest:

DONALD J. QUIGG

Attesting Officer

Commissioner of Patents and Trademarks